Dec. 13, 1960  A. ANDERSON  2,963,924
INDEX MECHANISM
Filed May 28, 1958  3 Sheets-Sheet 1
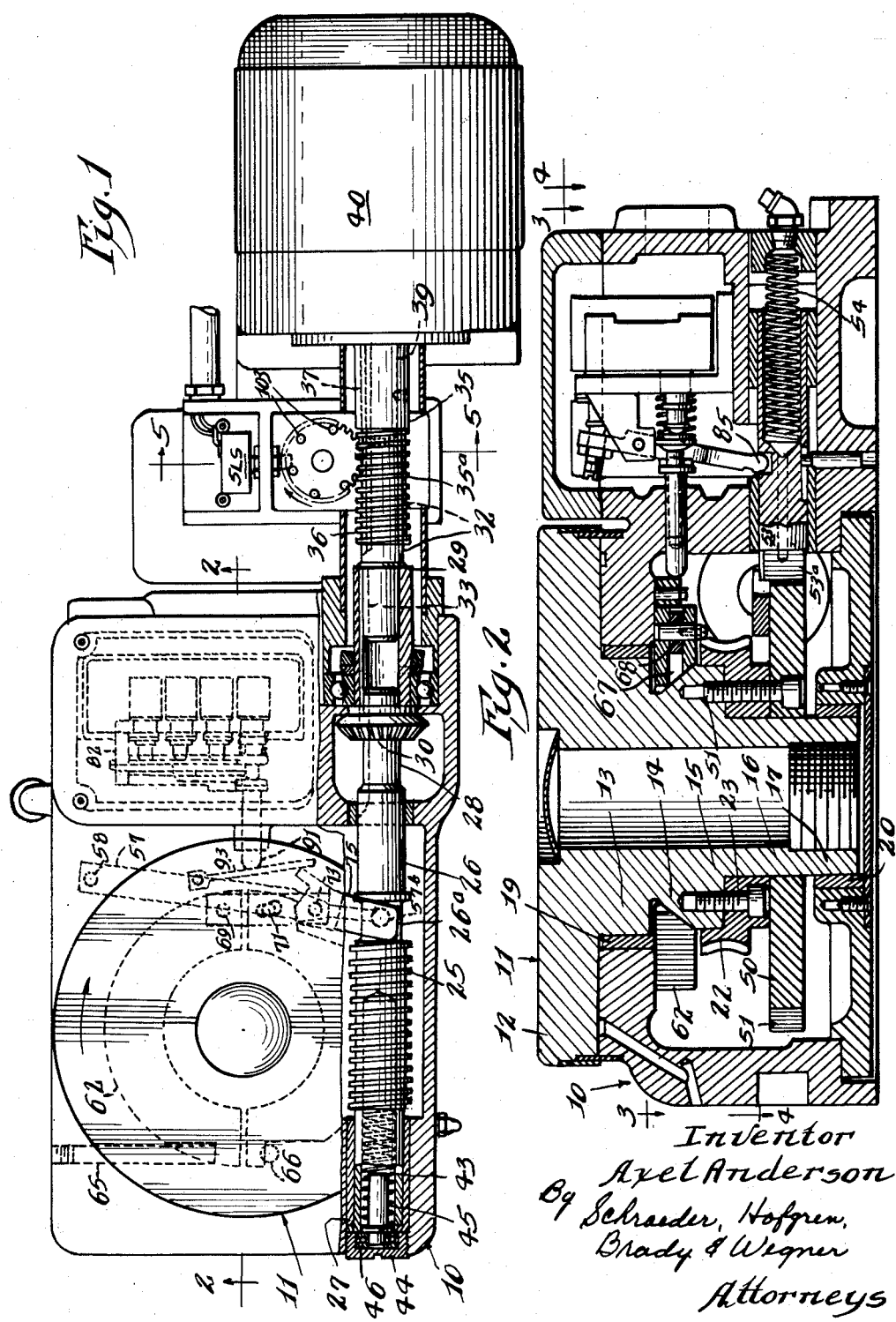
Inventor
Axel Anderson
By Schroeder, Hofgren,
Brady & Wegner
Attorneys Dec. 13, 1960 A. ANDERSON 2,963,924
INDEX MECHANISM
Filed May 28, 1958 3 Sheets-Sheet 2

Inventor
Axel Anderson
By Schroeder, Hofgren,
Brady & Wegner
Attorneys

Dec. 13, 1960 A. ANDERSON 2,963,924
INDEX MECHANISM
Filed May 28, 1958 3 Sheets-Sheet 3
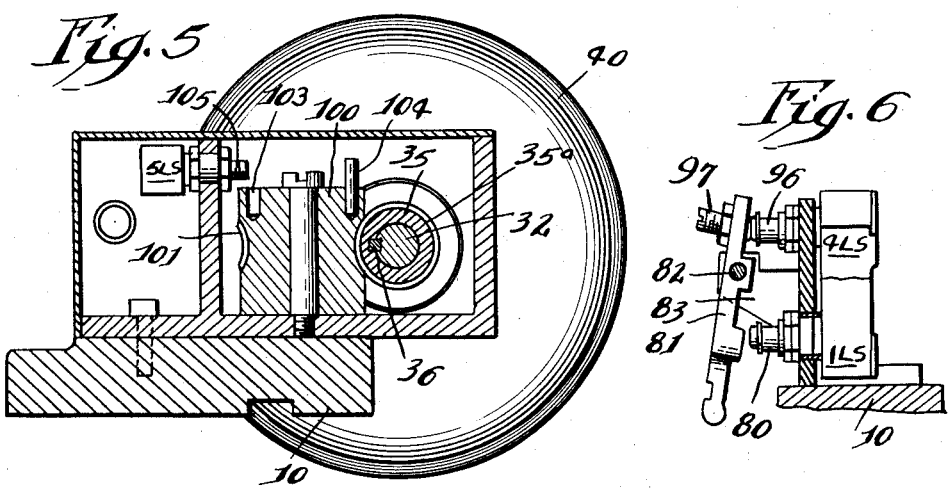
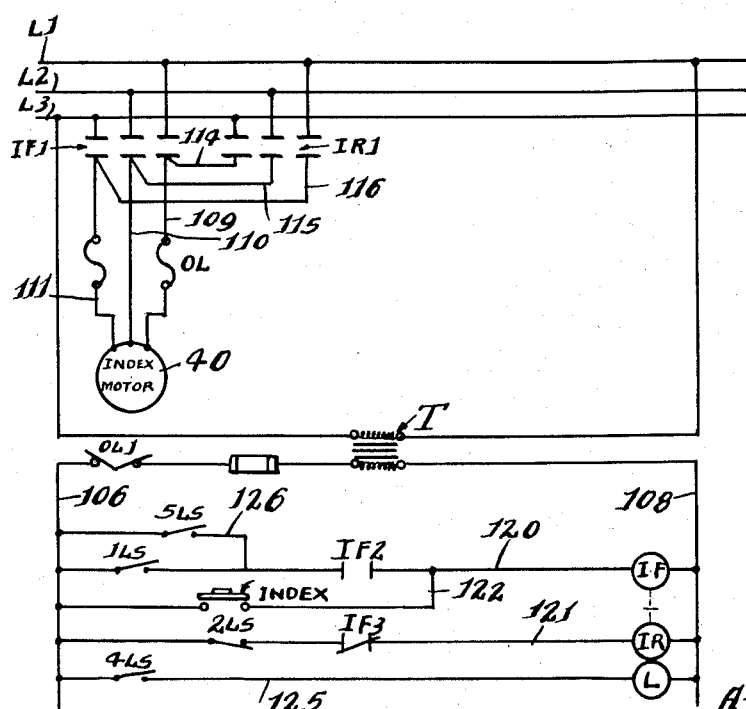
Inventor
Axel Anderson
By Schroeder, Hofgren,
Brady & Wegner
Attorneys

# United States Patent Office 2,963,924
Patented Dec. 13, 1960

2,963,924
INDEX MECHANISM

Axel Anderson, Rockford, Ill., assignor to Sundstrand Corporation, a corporation of Illinois Filed May 28, 1958, Ser. No. 738,416

9 Claims. (Cl. 74—818)

This invention relates to an indexing mechanism for a work table or the like in a machine tool.

It is a general object of the invention to provide a new and improved indexing mechanism of the type described.

A more specific object is to provide, in an indexing mechanism having an index plate with control cam surfaces thereon, a new and improved means for effectively masking the cam surfaces selectively.

Indexing mechanisms of the type referred to herein include an index plate movable with a work table or the like and having notches therein for receiving a locking plunger which serves to locate and accurately fix the position of the index plate and table. Usually, the notches are evenly spaced on the index plate and thereby enable location of the work table at a plurality of positions to thereby fix the position of the work relative to a tool. Frequently, it is desirable to skip certain of the work positions defined by the notches. In the past it has been customary to do this by physically masking certain notches, every other one of six for example, as by placing a cover over the selected notches. This procedure has been rather cumbersome and entails expensive work stoppages necessary in order to disassemble the apparatus to an extent sufficient to enable access to the index plate which of necessity is associated with the drive mechanism in rather inaccessible places.

The present invention provides a new and improved means for effectively masking notches in an index plate selectively from a position located remotely from the index plate and easily accessible without disassembly of any part of the apparatus.

Other objects and advantages will become readily apparent from the following detailed description taken in connection with the accompanying drawings, in which:

Fig. 1 is a plan view of an apparatus embodying the principles of the present invention;

Fig. 2 is an enlarged fragmentary sectional view taken at about the line 2—2 of Fig. 1;

Fig. 5 is an enlarged sectional view taken at about the line 5—5 of Fig. 1;

Fig. 6 is a fragmentary sectional view taken at about the line 6—6 of Fig. 3; and Fig. 7 is a wiring diagram illustrating a circuit embodying the principles of the present invention.

Figure 3:
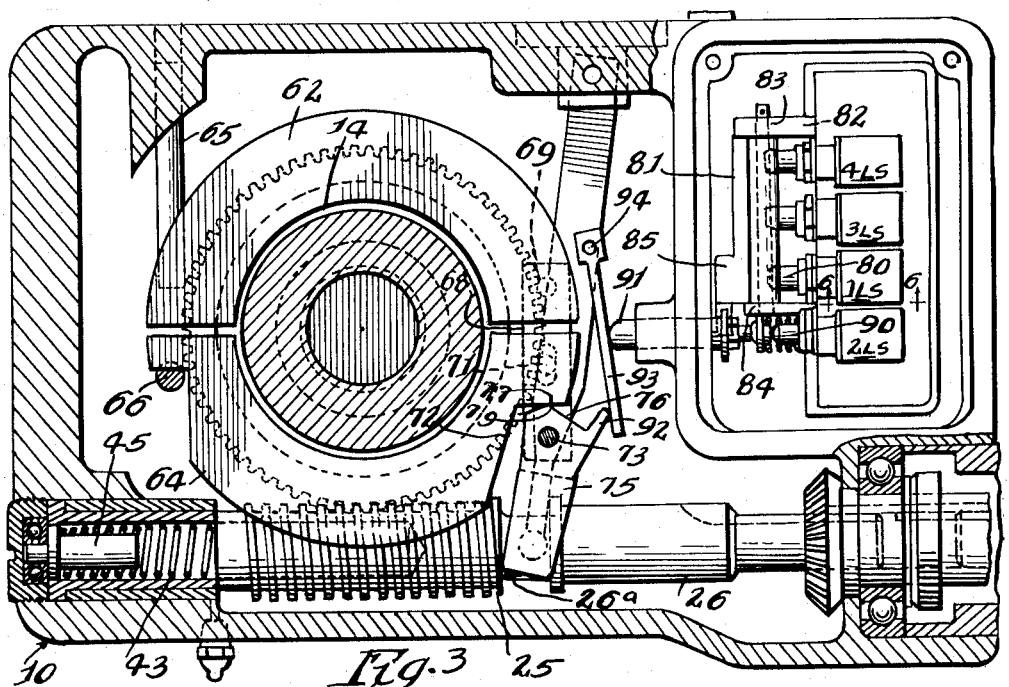
Fig. 3 is a sectional view taken at about the line 3—3 of Fig. 2.

While an illustrative embobiment of the invention is shown in the drawings and will be described in detail herein, the invention is susceptible of embodiment in many different forms, and it should be understood that the present disclosure is to be considered as an exemplification of the principles of the invention and is not intended to limit the invention to the embodiment illustrated. The scope of the invention will be pointed out in the appended claims.

Referring now to the drawings in more detail, the invention is embodied in an apparatus adapted to be mounted on a reciprocable work supporting slide in a milling machine or the like and including a frame or housing generally designated by the reference number 10. The housing 10 is suitably formed to facilitate the mounting of a rotatable work table 11 having an enlarged upper work supporting end 12, a reduced portion 13 immediately therebelow for rotatably mounting the table, a tapered braking portion 14, a gear supporting midportion 15, a reduced portion 16 for supporting an index plate, and a lower end portion 17 for rotatably mounting the table. The portions 13 and 17 are suitably mounted in bearings 19 and 20 which permit rotation of the table.

In order to rotate the table, it is provided with a driven worm gear 22 mounted on the midportion 15 and suitably affixed to the table as by means of screws 23. The worm gear is positioned for engagement by a driving worm 25 formed on a drive shaft 26. The drive shaft is rotatably supported in the housing at the left end thereof (as viewed in Fig. 1) by suitable bearing means such as that seen at 27, and has at its opposite end a reduced portion 28 axially slidable in a driving sleeve 29 but keyed for rotation with the driving sleeve as by key means seen at 30. Rotation of the driving sleeve 29 is effected by a driving shaft portion 32 keyed at its left end in the sleeve 29 as at 33 and keyed at its right end in a drive sleeve 35 as at 36. The drive sleeve 35 is keyed as at 37 on the drive shaft 39 of an electric drive motor 40. As will be apparent, the drive sleeve 35 is formed externally with a driving worm 35a, the purpose of which will appear presently.

The drive shaft 26, which is axially slidable in the drive sleeve 29 as described, is yieldably urged toward the right by means of a compression spring 43 seated in an axially opening bore in the shaft and held in position by means of an end cap 44 having a stub shaft 45 for receiving the spring thereon and suitably mounted for rotation as by means of a thrust bearing seen at 46. As will appear presently, when the work table is held against rotation and rotation of the shaft is continued, the yieldable mounting permits axial movement of the shaft, and such axial movement is employed to obtain operation of other structure in the apparatus.

Work tables such as that described are frequently employed for supporting one or more work pieces thereon to be indexed successively to a work position where the work piece or work pieces may be engaged by a tool. It is desirable that the indexing movement of the work table for this purpose to be accurately controlled in order to accurately position the work as desired. To this end, an index plate 50 is mounted on table portion 16 and suitably secured to the table as by screws 51 so that the index plate rotates with the table. As seen best in Fig. 4, the index plate is formed with a plurality of notches 51 on its periphery. As illustrated, the notches are equally spaced and six are provided, through the number and spacing of the notches may vary.

The notches 51 are formed for cooperation with a reciprocable plunger 53 which is yieldably urged toward the index plate 50 by a spring 54. Reciprocable movement of the plunger, controlled by the peripheral surface of the index plate and the notches formed therein, is utilized to obtain an accurate positioning of the table and additionally to maintain a control over energization of the drive motor 40. To this end, during rotation of the work table forwardly through an indexing step in a clockwise direction as indicated by the long arrow 55 in Fig. 4, the plunger 53 rides on the peripheral surface of the index plate 50 until such time as it encounters one of the notches 51 whereupon the plunger drops off onto a shallow intermediate surface portion 51a in the notch, skipping over a rather narrow and deep notch portion 51b. As will appear, when the plunger drops onto the surface 51a this serves to reverse the drive motor, causing reverse rotation of the work table and index plate in a counterclockwise direction, as indicated by the short arrow 56 in Fig. 4, until such time as the shouldered end 53a of the plunger engages a rearwardly facing shoulder 51c in the notch, whereupon further reverse rotation is prevented. As rotation of the index plate is not permitted at this time, axial movement of the drive shaft 26 and worm 25 occurs, toward the left, and such axial movement is employed to stop the drive motor as will be explained. The reduced end 53a of the plunger thereupon drops completely into the deepened portion 51b of the notch and table rotation in either direction is prevented. The position of the table is thereby accurately predetermined.

In order to obtain a succeeding table index, the plunger 53 must be withdrawn from the notch 51, and such withdrawal of the plunger is obtained by means of a lever 57 pivoted on the housing at 58, having a midportion 57a engagable with the plunger end to move the latter out of the notch and having a free end portion 57b positioned beneath the worm drive shaft 26 and engageable in a peripheral groove 26a on the shaft to pivot the lever in a counterclockwise direction on movement of the shaft axially toward the right. Axial movement of the shaft 26 toward the right occurs on energization of the drive motor 40 in a forward direction at a time when the plunger end 53a is still seated in the deepened portion 51b of the notch. It will be understood that this returns the worm shaft to its original position, at the same time releasing the index plate and work table for indexing rotation in a forward direction. Once retracted from the portion 51b of the notch, the plunger rides up an inclined portion 51d of the notch, onto the periphery of the index plate where it remains until the next notch is encountered and the operation described is repeated.

Preferably, adjacent one of the notches, the periphery of the index plate is formed with a short raised portion as at 60 which may be utilized to indicate the completion of an entire indexing cycle in installations where indexing is obtained entirely automatically. The raised portion 60 has no function in an installation such as that described herein wherein indexing is initiated under manual control.

In order to assist in properly locating and holding the table at each of the positions to which it may be indexed, the apparatus includes a brake or clamp mechanism engageable with the tapered portion 14 of the work table and including a pair of half circular brake or clamp shoes 62 and 64 having inclined inner surfaces fitted on the tapered portion 14. At the left, as viewed in Fig. 3, the shoe 62 is held in position by a pin 65 suitably mounted in housing 10, while shoe 64 is retained in position by a pin 66 suitably supported in the housing. At the right as viewed in Figs. 2 and 3, the shoe 62 has a central portion machined out as at 67, leaving a bifurcated shoe end which receives the end of a link 68 pivoted to the shoe as at 69. At the right the shoe 64 is also bifurcated and receives a midportion of the link 68 connected thereon as by a pin and slot connection 71. The opposite end of the link 68 projects outwardly into a recessed portion 72 of the shoe 64 and has a pivotal connection as at 73 with an operating lever 75. The opposite end of the operating lever is formed for engagement with the groove 26a in the shaft 26, so that axial movement of the shaft to the left effects a clockwise pivoting of the lever 75 and movement of the shaft to the right effects a counterclockwise pivoting of the lever.

Adjacent the pivotal connection 73, the lever 75 is formed with an inclined surface 76 engageable with an exposed surface 77 on the shoe 64 when the lever is pivoted in a counterclockwise direction from the position illustrated. This pivotal movement of lever 75 releases shoes 62 and 64, thereby permitting table rotation. On reverse movement of the index plate at the end of an indexing step, the end of plunger 53 engages a shoulder 51c in a notch 51 and prevents further reverse rotation of the plate, as previously described. At this time, continued rotation of the worm drive shaft results in axial movement of the shaft toward the left and this pivots the lever 75 in a clockwise direction to the position illustrated in Fig. 3 where a pointed end 79 of lever 75, adjacent surface 76, engages surface 77 on shoe 64 thereby drawing the two shoes together to clamp the work table in position. On initiating energization of the drive motor forwardly to begin a succeeding indexing step the worm drive shaft 26 moves toward the right, pivoting lever 75 in a counterclockwise direction to release the pressure of shoes 62 and 64 and permit rotation of the work table.

Figure 4:
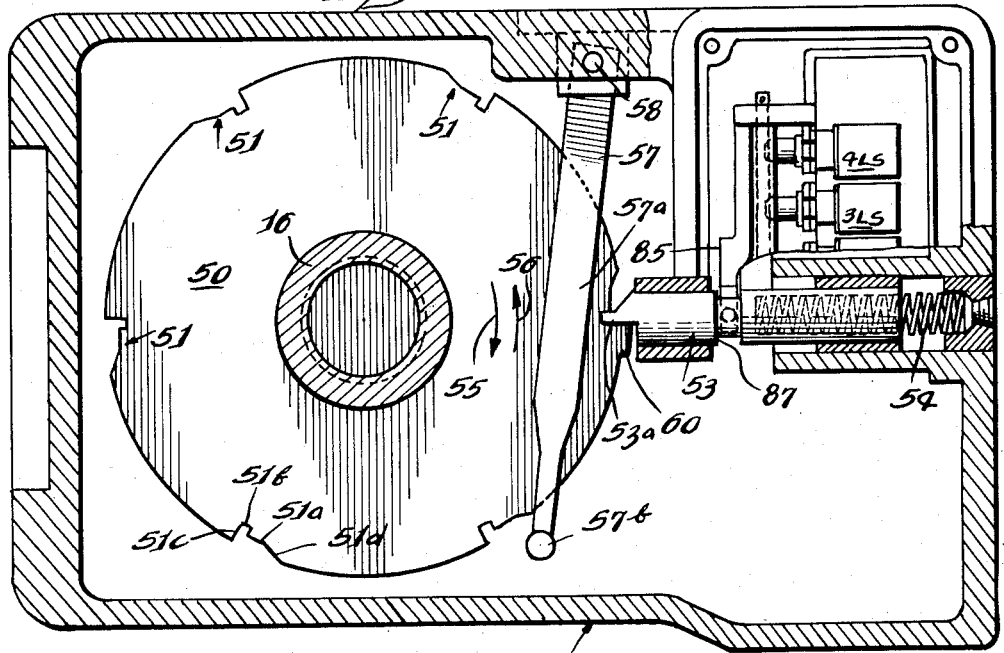
Fig. 4 is a sectional view taken at about the line 4—4 of Fig. 2.

In a preferred circuit, as illustrated in Fig. 7, each indexing step is initiated by manual depression of an "Index" switch, while successive operations to complete the indexing are controlled by automatically operated limit switches mounted in the housing 10. These include limit switches 1LS, 2LS and 4LS, seen best in Figs. 3, 4 and 6. The switch 3LS, visible in Figs. 3 and 4, is not utilized in the circuit illustrated in Fig. 7, but may be utilized in a circuit where indexing is effected completely automatically, as where indexing steps are initiated by reciprocable movement of a work supporting slide carrying the frame or housing 10.

After initiation of an indexing step on manual depression of the "Index" switch, rotation of the index plate continues in a forward direction until such time as the plunger 53 rides off the periphery of the index plate and drops onto the surface 51a of a notch 51 under urge of spring 54. This movement of the plunger is utilized to reverse the index motor 50 by operating limit switch 1LS. As seen in Figs. 3 and 6, the switch 1LS includes an actuating button 80 engageable by a lower portion of a swingable plate 81 pivoted as at 82 on a pair of supporting brackets 83 and 84. The plate has a lower end portion 85 projecting downwardly and forwardly so as to engage in a recess 87 formed in the plunger 53. In this manner, the pivoted plate is operated by reciprocation of the plunger. The function is such that when the plunger rides on the periphery of the index plate, the switch 1LS is held closed, but when the plunger drops onto the surface 51a the lever is pivoted clockwise and the switch 1LS is free to open. As will appear in describing the wiring diagram of Fig. 7 the opening of switch 1LS reverses the drive motor 40.

Limit switch 2LS is provided to deenergize the drive motor after the index plate is driven reversely at the conclusion of the indexing step. This switch includes a switch actuating button 90 (Fig. 3) controlled by a reciprocal plunger 91 and is normally in a closed position permitting reverse operation of the motor 40. At the end of the reverse movement of the index plate when the worm drive shaft 26 moves toward the left, pivoting lever 75 clockwise, a projecting portion 92 on the lever engages a switch actuating lever 93 pivoted on the housing as at 94 and engageable with plunger 91 to open the switch 2LS, deenergizing the motor. On return axial movement of the drive shaft toward the right, the switch 2LS is released for return to closed position.

The limit switch 4LS may be described as a safety switch in that it controls energization of a lamp which is energized when the end of locking plunger 53 is seated to prevent rotation of the index plate in either direction. This switch includes a switch actuating button 96 (Fig. 6) positioned for engagement by an adjustable screw 97 carried in an upper portion of the pivoted switch actuating plate 81. The arrangement is such that movement of the locking plunger 53 to its extreme left-most position pivots the plate 81 in a clockwise direction to close the normally open switch 4LS.

Frequently, it is desirable to omit work positions represented by some of the notches 51 provided in the index plate. For example, it may be advantageous to omit every other one of the work table stops and include only 3 work positions in each indexing cycle. In the past, this has been effected by physically masking one or more of the index notches as by placing a cover over or a plug in each of the notches to be omitted. This procedure has certain disadvantages as will be obvious in that the index plate is not readily accessible and the masking requires work stoppages to disassemble the apparatus sufficiently to permit access to the notches. According to the present device, these disadvantages are obviated by providing a remotely positioned control which is readily accessible and which functions to effectively mask any one or more selected notches. Referring particularly to Figs. 1 and 5, the improved control comprises a rotatable drum like control member 100 suitably mounted on the motor support for rotation proportionately with rotation of the index plate. In order to obtain the desired rotation, the control member is formed with an integral worm gear 101 engageable with the driving worm 35a on drive sleeve 35 previously referred to.

According to the preferred arrangement, an upper surface of the rotatable control member is formed with a plurality of axially opening pin receiving pockets or recesses 103 which, as illustrated herein, are equal in number to the notches on the index plate and spaced angularly apart as the notches are spaced on the index plate.

A plurality of switch actuating pins, such as that illustrated at 104 are provided and these are selectively positionable in selected pin receiving recesses corresponding respectively with one or more selected notches 51 which are to be effectively masked. The switch actuating pins 104 when mounted in the recesses 103 are positioned to successively engage the switch actuating button 105 of a limit switch 5LS as the control member 100 is rotated in proportion to rotation of the index plate. The switch 5LS is a normally open switch and is provided as a disabling means to prevent deenergization of the drive motor 40 and reversal of this motor by the limit switch 1LS. The pins 104 when positioned in the recesses 103 are disposed so as to actuate the switch 5LS just prior to actuation of the switch 1LS so that operation of the switch 1LS has no effect, and instead the index motor continues driving and the index plate continues rotation, thereby skipping the index notch 51 corresponding to the pin recess 101 in which a switch actuating pin has been placed.

Referring now to Fig. 7 for an understanding of the electric circuit, a three phase source of power is represented by the lines L1, L2 and L3. A transformer T has its primary connected across the lines L1 and L3. Wires 106 and 108 are connected across the transformer secondary and provide a control circuit for controlling energization of the index motor 40 which is connected to the lines L1, L2 and L3 by wires 109, 110 and 111. The wires 109, 110 and 111 have relay controlled switch contacts IF for energizing the motor forwardly. In order to energize the motor reversely, wires 109, 110 and 111 are reversely connected to the lines L3, L2 and L1 by means of wires 114, 115 and 116 which include relay controlled switch contacts IR1. Wires 109 and 111 include overload relay windings OL which control switch contacts OL1 in wire 106 for deenergizing the control circuit in the event of an overload current in the index motor.

Switch contacts IF1 for controlling energization of the index motor forwardly are controlled by a relay having a coil IF which is connected in a wire 120 in turn connected across the wires 106 and 108. Switch contacts IR1 are controlled by a relay having a coil IR in a wire 121 connected across wires 106 and 108. Energization of coil IF to obtain forward rotation of the work table and index plate is initiated by depression of the "Index" switch in a wire 122 connected between the wire 106 and the wire 120. Energization of coil IF closes the normally open contacts IF1, energizing the motor 40, and also causes closure of normally open switch contacts IF2 in the wire 120 to complete a holding circuit for the coil through the limit switch 1LS which is closed after a short period of motor operation due to movement of the worm drive shaft 26 to the right, retracting the locking plunger 53 and closing the switch. After this time, the "Index" switch may be released and the coil IF remains energized. On energization of the coil IF, its normally closed switch contacts IF3 in wire 121 are opened in order to prevent energization of the coil IR for operating the index motor reversely.

As the index plate continues to rotate, and the lock plunger 53 rides off the periphery of the index plate onto a surface 51a in one of the notches 51, switch 1LS opens, deenergizing the coil IF, stopping the motor, closing the contacts IF3 in wire 121 and energizing the coil IR through the normally closed switch 2LS. Energization of the coil IR closes the contacts IR1 in circuit with the index motor, energizing the motor reversely. The motor remains energized until such time as the shoulder 51c of an index notch 51 engages the end portion of plunger 53, whereupon the drive worm 26 moves toward the left as viewed in Fig. 3, pivoting levers 75 and 93, to thereby open the switch 2LS and deenergize the motor. The reduced end portion of plunger 53 drops into the deepened portion 51b of an index notch 51, closing switch 4LS and completing a circuit through a wire 125 to energize the lamp L, indicating that the index plate and work table are locked against rotation in either direction. This condition remains static until such time as the "Index" switch is again closed.

In order to obtain another indexing of the work table, the "Index" switch is depressed as before, energizing motor 40 forwardly. As the end of plunger 53 is seated in the deep portion 51b of a notch 51, table rotation is prevented and worm drive shaft 26 moves axially toward the right, retracting plunger 53 and releasing clamp shoes 62 and 64 to permit table rotation. Retraction of the plunger closes limit switch 1LS to complete a holding circuit to forward coil IF, and pivotal movement of lever 75 closes the reversing switch 2LS. The indexing step is completed as described before.

In the event that a switch actuating pin 104 has been placed in one of the pin receiving recesses 103 of the control member 100, when such pin approaches and actuates the switch 5LS, just prior to operation of the switch 1LS by the corresponding notch 51, the switch 5LS is closed, completing a circuit through the wire 126 which is connected in parallel around the switch 1LS, so that when the latter opens the circuit to the coil IF, the coil is not deenergized but is maintained energized through the switch 5LS to thereby maintain energization of the index motor 40. Accordingly, the index motor is not stopped and reversed, but continues driving and the notch 51 corresponding to the recess 101 in which a pin has been placed is passed up, so that the notch has been effectively masked. It will be appreciated that pins 104 may be placed in such recesses 103 as are desired, including one or more of the recesses.

I claim:

1. In an indexing mechanism having an index plate, drive means for moving said index plate, means for energizing said drive means, means for deenergizing said drive means, means for actuating said deenergizing means, and spaced cams on said index plate successively engageable with said actuating means on movement of said index plate to deenergize said drive means at positions determined by said cams, the improvement comprising, control means movable proportionately with said index plate and selectively conditionable to disable said deenergizing means just prior to operation thereof by a selected one of said cams and thereby prevent deenergization of said drive means at a position corresponding to said selected cam.

2. In an indexing mechanism having an index plate, drive means for moving said index plate, means for energizing said drive means, means for deenergizing said drive means, means for actuating said deenergizing means, and spaced cams on said index plate successively engageable with said actuating means on movement of said index plate to deenergize said drive means at positions determined by said cams, the improvement comprising, means for effectively masking a selected one of said cams including disabling means operable to disable said deenergizing means, and control means movable proportionately with said index plate and selectively conditionable to operate said disabling means just prior to operation of said deenergizing means by said selected cam to thereby prevent deenergization of said drive means at a position corresponding to said selected cam.

3. In an indexing mechanism having an index plate, drive means for moving said index plate, means for energizing said drive means, means for deenergizing said drive means, means for operating the deenergizing means, and spaced cams on said index plate successively engageable with said operating means on movement of said index plate to deenergize said drive means at positions determined by said cams, the improvement comprising, control means for effectively masking a selected one or more of said cams including, a control member, means for moving said control member proportionately with movement of said index plate, a plurality of actuators selectively positionable on said control member at positions corresponding respectively with said one or more selected cams, and disabling means operable successively by each actuator positioned on said control member to disable said deenergizing means just prior to operation thereof by said one or more selected cams and thereby prevent deenergization of said drive means at positions corresponding to said one or more selected cams.

4. An indexing mechanism, comprising, a rotatable index plate, drive means for rotating said index plate, means for energizing said drive means, means for deenergizing said drive means, means for operating said deenergizing means, a plurality of spaced notches on the periphery of said index plate successively engageable with said operating means on rotation of said index plate to deenergize said drive means at positions corresponding to said notches, and control means for effectively masking a selected one or more of said notches including a rotatable control member, means for rotating said control member proportionately with rotation of said index plate, a plurality of receivers on said control member corresponding in number and in spacing with said notches, a plurality of actuators selectively positionable in one or more of said receivers corresponding respectively with said one or more selected notches, and disabling means operable successively by each actuator positioned in said one or more selected receivers to disable said deenergizing means just prior to operation thereof by each of said one or more selected notches to thereby prevent deenergization of said drive means at positions corresponding to said one or more selected notches.

5. An indexing mechanism comprising, a movable index plate having a plurality of notches thereon, drive means for moving the index plate forwardly or reversely, selectively operable means for energizing said drive means forwardly, means for reversing said drive means, a reciprocable plunger engageable successively with said notches on movement of said index plate forwardly to actuate said reversing means and thereby reverse said drive means when said plunger encounters said notches, said notches each including a rearwardly facing shoulder engageable by said plunger to limit reverse movement of said index plate, an element in said drive means yieldable on engagement of said plunger with said shoulder, and means operable by said yieldable element for deenergizing said drive means when said plunger engages said shoulders, and means for effectively masking a selected one of said notches including disabling means operable to disable said reversing means, and control means movable proportionately with said index plate and selectively conditionable to operate said disabling means just prior to operation of said reversing means by said selected notch to thereby prevent stoppage of said index plate at a position corresponding to said selected notch.

6. An indexing mechanism, comprising, a rotatable index plate having a plurality of spaced notches on the periphery thereof, drive means for rotating said index plate including a driven worm gear and a driving worm engageable therewith and axially movable when the worm gear is held against rotation, selectively operable means for energizing said drive means forwardly, means for reversing said drive means, a reciprocable plunger engageable successively with said notches on rotation of said index plate forwardly to actuate said reversing means and thereby reverse said drive means when said plunger encounters said notches, said notches each including a rearwardly facing shoulder engageable with said plunger on reverse rotation of said index plate to thereby limit reverse rotation of said index plate, means responsive to axial movement of said worm in one direction when said plunger engages said shoulders for deenergizing said drive means, said notches each including a deep seat portion for receiving the end of said plunger when the latter engages said shoulder to prevent rotation of said index plate in either direction, initial operation of said drive means in a forward direction while said plunger end is positioned in one of said deep seat portions causing return axial movement of said worm in the opposite direction, means operable by said worm during said return axial movement for retracting said plunger from said deep seat portion to free said index plate for rotation forwardly, and means for effectively masking a selected one of said notches including disabling means operable to disable said reversing means, and control means movable proportionately with said index plate and selectively positionable to operate said disabling means just prior to operation of said reversing means by said selected notch to thereby prevent stoppage of said index plate at a position corresponding to said selected notch.

7. A table indexing mechanism, comprising, a rotatable work table, a drive shaft connected by gearing to rotate said table, a drive motor for rotating said drive shaft, means for energizing said drive motor, means for deenergizing said drive motor, means for operating said deenergizing means, an index plate rotatable with said table, a plurality of spaced cams on said index plate successively engageable with said operating means on rotation of said table and index plate to deenergize said motor at positions determined by said cams, and control means for effectively masking selected ones of said cams including a rotatable control member, means connecting said drive shaft to rotate said control member proportionately with rotation of said index plate, a plurality of pin receiving pockets on the control member corresponding in number and in spacing with said cams, a plurality of pins selectively positionable in pockets corresponding respectively to said selected cams, and switch means engageable by each pin positioned in said selected pockets to disable said deenergizing means just prior to operation thereof by each of said selected cams to thereby prevent deenergization of said motor at positions corresponding to said selected cams.

8. An indexing mechanism comprising, a rotatable index plate, drive means for rotating said index plate including a drive motor, circuit means including a switch for energizing said drive motor, switch means in said circuit for deenergizing said drive motor, means for operating said switch means, a plurality of spaced notches on the periphery of said index plate successively engageable with said operating means on rotation of said index plate to deenergize said drive motor at positions corresponding to said notches and control means for effectively masking a selected one or more of said notches including a rotatable control member, means connecting said drive means with said control member to rotate the latter proportionately with rotation of said index plate, a plurality of pin receiving recesses on said control member corresponding in number and spacing with said notches, a plurality of switch actuating pins selectively positionable in one or more of said recesses corresponding respectively with said one or more selected notches, and disabling switch means in said circuit operable successively by each pin positioned in said one or more selected recesses to disable said deenergizing switch means prior to operation thereof by each of said one or more selected notches.

9. An indexing mechanism comprising, a movable index plate having a plurality of spaced cams thereon, drive means for moving the index plate forwardly or reversely, means for energizing said drive means forwardly, means for reversing said drive means, a reversing means operator engageable successively with said cams on movement of said index plate forwardly to thereby reverse said drive means when said operator encounters said cams, said cams each including a rearwardly facing shoulder engageable by said operator to limit reverse movement of said index plate, an element yieldable on engagement of said operator with said shoulder, means operable by said yieldable element for deenergizing said drive means when said operator engages said shoulders, and means for effectively masking a selected one of said cams including disabling means operable to disable said reversing means, and control means movable proportionately with said index plate and selectively conditionable to operate said disabling means just prior to operation of said reversing means by said selected cam to thereby prevent stoppage of said index plate at a position corresponding to said selected cam.

References Cited in the file of this patent
UNITED STATES PATENTS

| | | |
|---|---|---|
| 2,190,832 | Elliott | Feb. 20, 1940 |
| 2,358,503 | Godfriaux | Sept. 19, 1944 |
| 2,577,663 | Owens | Dec. 4, 1951 |